PROCESS FOR COOLING A CONSUMER CONSISTING OF A PARTLY STABILIZED SUPERCONDUCTIVE MAGNET
Filed Dec. 11, 1969
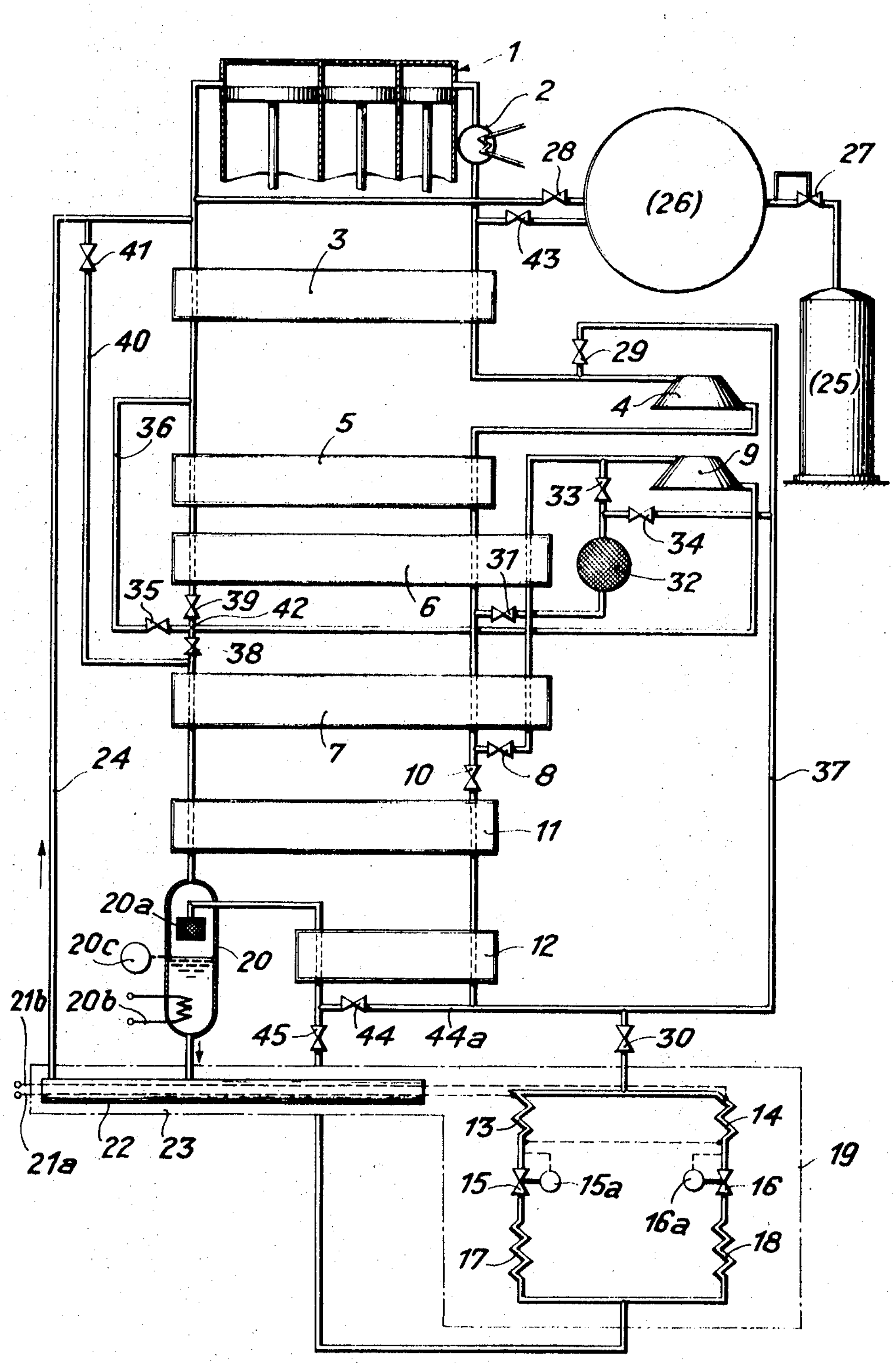
Inventor:
URS GIGER
BY
Kenyon & Kenyon
ATTORNEYS

United States Patent Office 3,611,740

Patented Oct. 12, 1971

3,611,740

PROCESS FOR COOLING A CONSUMER CONSISTING OF A PARTLY STABILIZED SUPERCONDUCTIVE MAGNET

Urs Giger, Abtwil, Saint Gall, Switzerland, assignor to Sulzer Brothers, Ltd., Winterthur, Switzerland Filed Dec. 11, 1969, Ser. No. 884,175
Claims priority, application Switzerland, Dec. 19, 1968, 18,955/68
Int. Cl. F25b 7/00
U.S. Cl. 62—79 5 Claims

ABSTRACT OF THE DISCLOSURE

The partly stabilized superconductive magnet is cooled by separating the helium stream into two part-flows. One part flow is throttled, heated, expanded while doing work, and then directed back into the circuit downstream of the consumer. The other part-flow is throttled to a pressure above critical, cooled, directed through a hollow conductor forming the magnet while throttling the flow and then further throttled in a valve to form a gas and liquid mixture, heated and then returned to the compressor.

The invention relates to a process for cooling a consumer, which consists of a partly stabilized superconductive magnet, by the aid of a stream of helium circulating in a cooling circuit.

As is known, there is a distinction between completely and partly stabilized superconductive magnets. For example, during operation, flux jumps can occur in the coils of a superconductive magnet which can produce a localized heating of the conductor material to a point above the jump temperature. As a result, an additional ohmic heat is immediately produced at a point which has already become normally conductive. In this way, an avalanche effect may occur, which heats the entire magnet above the jump-temperature. As is well known, the measures for preventing such an avalanche effect are termed magnet stabilizers. The superconductive material, for example Nb-Ti or Nb-Zr is for this purpose embedded in a good normal conductor, for example copper or aluminum, which provides for rapid dissipation of heat and absorbs the conducted current when transition to normal conducting occurs under certain conditions. If a magnet contains normally-conducting conductor parts over a long time, without an avalanche effect occurring, then it is said to be completely stabilized.

On the other hand, one speaks of partly stabilized magnets when local exceeding of the jump-temperature is completely, or at least to a great extent, prevented by a cooling far below the jump-temperature.

It was formerly usual to dispose the coils of superconductive magnets in a bath of liquid helium cooled down to approximately 5.5° K. In this case, only relatively poor heat-transfer values could be obtained for the transfer of heat from the coils to the liquid helium, because a part of the liquid helium during absorption of heat, at the heat-transferring surfaces between the liquid bath and the coils, evaporated, and formed, at least partly, a layer of helium vapor that considerably impaired the heat-transfer. Under certain circumstances, this however requires a very great mass of normal conductive material in the coil or coils, so that during a sudden heating of the superconductive material to a temperature above the jump-temperature, the normal conductor may be capable of absorbing the resultant ohmic heat. Furthermore, because of the great mass of normal conductive material which substantially increases the dimensions and thus the weight of the magnets, and because of the relatively great peripheral surfaces of the coil, a corresponding great inflow of heat from the outside has to be compensated by a substantial cooling performance.

Accordingly, it is an object of the invention to provide superconductive magnets of relatively small size.

It is another object of the invention to increase the heat transfer rate between a partly stabilized superconductive magnet and a cooling circuit.

It is another object of the invention to be able to use magnets of less weight and volume than previously.

It is another object of the invention to use a relatively small mass of normal conductive material to cool the coils of a superconductive magnet.

These and other objects and advantages of the invention will become more apparent from the following detailed description and appended claims taken in conjunction with the accompanying drawing in which:

The drawing schematically illustrates a cooling circuit in combination with a superconductive magnet which utilizes a process of the invention.

Briefly, the invention provides a process in which a consumer consisting of a partly stabilized superconductive magnet is cooled. The process utilizes a cooling circuit in which helium is compressed, cooled below its inversion temperature, and divided into two part-flows. A first of these part flows is throttled, heated by means of a heat-exchange with the helium of the unthrottled circuit, expanded while accomplishing work, and combined with circuit helium of corresponding pressure. The second part-flow is throttled to a pressure above the critical pressure and cooled though heat-exchange with the cold circuit helium, flows without condensation or evaporation through at least one coil of the magnet made as a hollow conductor (which consists of a normal electric conductor in which superconductive elements are embedded) and hereby becomes throttled. This part-flow then becomes further throttled while forming a mixture of vapor and liquid, which then, in absorbing heat from other elements associated with the consumer, becomes evaporated, for the greater part at least, and finally, through a heat-exchange with the helium circulating in the cooling circuit, becomes heated and compacted anew.

Generally, very great heat-transfer coefficients are needed for absorbing the heat that occurs during flux changes in magnets. Because of the great mass-flow density of the cooling medium and the great length of the hollow conduit or conduits, the helium undergoes a relatively great pressure drop. For this reason, the second part-flow is throttled to above-critical pressure before entry into the magnet coil, that is, to a pressure greater than 2.26 atmospheres, for example 6 to 9 atmospheres, so that the greatest pressure drop may occur in the hollow conduit. The inflow pressure of the helium into the hollow conduit is advantageously made high enough for the helium to leave the hollow conduit at above-critical pressure, i.e. in the gaseous state.

Another way of carrying out the invention consists in that the gaseous part-flow of helium entering the hollow conduit with above-critical pressure is throttled so greatly that the part-flow leaves the conduit as an undercooled fluid at under-critical pressure. While a phase conversion of a gas into an under-cooled liquid is thus allowed to occur within the hollow conduit, since only helium flows through the hollow conduit in a phase which is either gaseous or is an under-cooled liquid, good heat-transfer coefficients are always reahed, in contrast to the former usual process where liquid helium becomes partly evaporated during the absorption of heat.

On occasion, it may be advantageous to carry out the process in such a way that the second part-flow, through heat-exchange with other elements of the consumer, evaporates complely. In this case, a part-quantity of the helium vapor is used for cooling the electrical conductors to and away from the coil, whereby this part-quantity becomes heated to the surrounding temperature, and then becomes compressed anew along with the remaining helium of the circuit.

Referring to the drawing in which only the details needed for explaining the invention are illustrated, a cooling system includes a three stage compressor 1 in which helium is compressed to above the critical pressure, for example to 20 atmospheres, and a cooler 2 for drawing off the compression heat from the helium. A line is connected from the cooler 2 to a heat-exchanger 3 in which the helium becomes further cooled in counterflow to a cooler gas, as well be explained in more detail below. An expansion turbine 4 is connected to the heat exchanger 3 to expand the helium while doing work and a pair of heat-exchangers 5, 6 are then connected downstream of the turbine 4 to further cool the helium, in counterflow to cooler gas, to a temperature below its inversion temperature. A further cooling down of the helium gas follows in a heat-exchanger 7, after which the gas is divided into two part-flows.

A first part-flow is decompressed in a throttle valve 8, is heated in the heat-exchangers 7 and 6 in counterflow to the unthrottled helium, and is decompressed in a turbine 9 to about the suction pressure of the compressor 1, while accomplishing work, and is combined with the gas flowing back into the cooling circuit before entering into the heat-exchanger 6.

The expansion-turbines 4, 9 serve essentially for cooling down the compressed gas from the surrounding temperature to a temperature that is lower than the inversion temperature and/or for making good the thermodynamic losses in the heat-exchangers 3, 5, 6 and 7.

The second part-flow serves directly for cooling magnet coils 13, 14 and their associated elements that need cooling. To this end, this part-flow is decompressed in a throttling valve 10 to a pressure above the critical pressure. For example, this pressure is so high that the gas, after flowing through the magnet coils 13, 14 while undergoing a considerable drop of pressure, still has an overcritical pressure upon exiting. That is, no liquification of the gas occurs in the magnet coils. After being throttled in the valve 10, the gas is further cooled down in a pair of heat-exchangers 11, 12 in counterflow to cool gas, to a desired temperature, of for example 4.5° K. for delivery to the magnet coils 13, 14 via a valve 30.

As shown, the two similar magnet coils 13 and 14 are connected in parallel with respect to the cooling medium. These magnet coils 13, 14 are made as hollow conduits, which consist of copper for example, in which are embedded Nb-Ti wires. Of course, and corresponding to the form of construction being considered, a magnet may be provided with only one coil or with more than two coils.

The stream of helium flows through both hollow conduits 13, 14, and thus serves to hold the superconductive elements of the coils below their jump-temperature, so that the normal conductors of the coils act as electric insulators. As was explained at the outset, the helium becomes greatly throttled in the coils. Because of the great mass flow density far better heat-transfer coefficients are obtained than in the case of liquid helium which would be partly vaporized during passage through the coils. Each helium conducting conduit leading from the coils 13, 14 has a regulatory valve 15, 16 respectively, therein as well as a pressure-regulating device 15*a*, 16*a* of known type of construction so that the gaseous helium leaving the coils 13, 14 can be throttled to an under-critical pressure, whereby a mixture of vapor and liquid is produced. The pressure regulation influences the pressure of the helium entering the coils 13, 14 and thus at the same time effects regulation of the quantity of helium which goes through the coils 13, 14.

It is noted that the mixture of vapor and liquid serves to cool elements that are not illustrated in the drawing, but which are represented by structures 17, 18 shown schematically as tubular coils. These structures 17, 18 are essentially a matter of arrangements for supporting the coils, which may be of considerable weight. Such structures are, for example, supported upon a base which is at room temperature, and which therefore needs cooling to prevent an introduction of heat into the magnet coils 13, 14 either through heat-conduction or through heat-radiation. These structures moreover also comprise the cooling arrangements for the valves 15, 16, and for connection lines which are connected into the cold part of the installation, and are for measuring instruments (not shown) which are installed in a place of higher temperature.

A vacuum tank 19 encloses the coils 13, 14, the valves 15, 16, the pressure-regulating devices 15*a*, 16*a*, and the tubular coils 17, 18.

During operation, most of the liquid part of the helium flowing through the tubular coils 17, 18 evaporates through heat exchange with the elements that are to be cooled. The resulting mixture is then introduced into a liquid separator 20 through the heat-exchanger 12, in which a further portion is evaporated through absorption of heat from the throttled helium gas. The separator 20 houses a filter 20*a* which serves to separate the portion of the helium still remaining from the liquid. The vaporous part of the helium flows back through the heat-exchangers 11, 7, 6, 5 and 3 to the suction side of the compressor, where heat is absorbed from the counterflowing stream of helium so that the vaporous helium becomes heated to approximately the surrounding temperature. The liquid helium on the other hand, is conducted into a jacket-tube 22 which surrounds inflow and outflow conduits 21*a*, 21*b* for the electrical leads to the wires in the magnets 13, 14 and which is disposed in an evacuated jacket-tube 23. The helium introduced into the jacket-tube 22 serves to cool the electric lead-ins and lead-outs from the surrounding temperature down to the operating temperature of the magnet coils. As a result, the liquid helium is evaporated and becomes heated up to approximately the surrounding temperature. This helium vapor is conducted back to the suction side of the compressor through a conduit 24 which bypasses the heat exchangers.

The separator 20 also contains a heating device 20*b* which is connected with a level-regulating device 20*c* of the usual kind. The level-regulating device 20*c* serves the following purpose: When, for example, there is a temporary lower cooling performance than normal in the consumer, the liquid portion of the helium introduced into the separator 20 becomes increased, so that the level of liquid rises. In this case, the heating device 20*b* is automatically put into operation by the level-regulating device 20*c* and such a quantity of liquid helium is vaporized that the level of the liquid again becomes adjusted to the desired height. Also, a conduit 37 is connected over a valve 29 upstream of the turbine 4 and at the downstream end to the line between the heat exchanger 12 and valve 30.

For the sake of completeness, there is described in the following manner and method of filling the installation, and the cooling-down of the magnets during the initiation of operation. It should be mentioned that the installation need be filled only once with helium, and that during the intervals of time during which the installation stands still, the magnet being out of operation, the helium remains in the installation, so that even during this stoppage no transfer of helium into a gasometer is necessary. For this reason the gas need be purified only during the filling period.

In order to effect the filling, helium is introduced from a flask 25 of compressed gas into a buffer volume 26 through a throttle valve 27 which reduces the pressure of the helium to the desired pressure. The buffer-volume 26 connects over a valve 28 to the compressor 1 so that helium is filled into the installation at the surrounding temperature, and for example, at a pressure of about 10 atmospheres. For this purpose the valve 28, valve 29 and the valve 30 are opened. The compressor 1 and the turbines 4, 9 are out of operation at this time.

Now the cooling period begins, and it is divided into a number of stages.

After the cooling circuit of the installation has been filled with helium, the valve 27 is closed, and the compressor 1 is set into operation together with the turbines 4, 9. The magnet 13, 14 is cooled down, in a number of stages to its operating temperature of, for example, 4.5° K. In the first stage, helium gas is compressed in the compressor 1, flows from there through the cooler 2 and the heat-exchanger 3. A part-quantity then flows through the turbine 4 and becomes decompressed while performing work. This gas flow is now conducted onward through the heat-exchangers 5, 6, and, with the valve 31 opened, through an adsorption device 32 which, for example, contains active carbon to be freed of impurities. From here, the gas flows through the valve 33 and the turbine 9, and, with valve 34 closed and valve 35 opened, through a bypass conduit 36 to the suction side of the compressor 1 between the first and second heat-exchangers 3, 5. The other part of the compressed gas, with valve 29 opened, flows through the conduit 37, the magnet coils 13, 14 and cooling coils 17, 18, and from there, with valve 38 closed and valve 41 open, back to the suction side of the compressor 1. As soon as the magnet has become cooled down to approximately the operating temperature of, for example, 90° K. at the inlet into the turbine 4, the second cooling stage begins.

In the second cooling stage, gas is forced from the compressor 1 through the cooler 2 and the heat-exchanger 3. A part-quantity of the gas flows, with valve 29 opened, through the conduit 37 into the coils 13, 14 and onward through the cooling coils 17, 18, back through the heat-exchangers 12, 11, 7, and 3, with valves 38 and 35 opened and valves 39 and 41 closed. The other part of the gas becomes decompressed in the turbine 4, is conducted through the heat-exchangers 5 and 6, and, with valves 31 and 33 opened, flows through the adsorption device 32 and the turbine 9. The gas is decompressed in the turbine 9 and at the location 42 between the heat exchangers 6, 7 becomes combined with the gas flowing back out of the magnets. Later, valve 29 and valve 35 are closed, valve 33 remains opened, and the valves 34 and 39 are likewise opened so that the magnet coils 13, 14 and cooling coils 17, 18 likewise have cold gas flowing through them. This stage of the process lasts until the temperature into the inlet of the turbine 9 has fallen to approximately an operating temperature of, for example, 15° K.

In the third stage of the process, the valves 31, 33 and 34 are closed, so that the path of the gas corresponds to that of normal operation, and the gas becomes cooled down until the temperature at the inlet into the magnet coils 13, 14 corresponds to the desired operating temperature of for example 4.5° K. Then, the installation begins normal operation. For example, by the aid of temperature-measuring instruments (not shown), the inflow temperature of the helium into the hollow conduits 13, 14 may be monitored.

It should also be mentioned that as soon as the compressor 1 is put into operation, the valve 28 is closed and the valve 43 is opened, so that the buffer-volume 26 is in communication with the pressure side of the compressor 1. During cooling-down, the valve 43 is closed, and gas is supplied continuously into the circuit through valve 28.

During normal operation, the buffer-volume 26 is in communication with the suction side of the compressor 1 by way of the opened valve 28.

The installation is constructed in a gas-tight manner. Thus, as soon as the coolant circuit has been filled, the connection to the flask 25 of compressed gas, in which helium is stored under a pressure of for example 200 atmospheres, with the installation may be interrupted. It is thus necessary, only after the installation has been filled with helium, to free this helium of foreign substances in the adsorption device. When operation of the installation is interrupted, the helium therein heats up to the surrounding temperature at a pressure of, for example, about 10 atmospheres.

The valves 30 and 45 are shut-off organs, which may, for example, be closed when the cooling parts associated with the magnet are to be separated from the remaining cooling installation, for example, for inspection or cleaning purposes. If during this time, the cooling installation is to be kept cold, then the helium is passed through a bypass 44*a* which is opened or closed to the flow by a valve 44. It is noted that other cooling arrangements and forms of construction are possible for bringing the electrical conductors to and away from the magnet coils.

It is also noted that among elements associated with the consumer are to be understood in the first place supporting arrangements, by which the coil is supported on at least one base, and also valves, conductors, for example connection lines for measuring instruments and the like disposed along the flow-path of the helium. The helium cooling contrivances, for example cooling coils, are heat-insulated from the outside space, like the magnet coils, through a vacuum-jacket having, for example, a pressure of $10^{-6}$ torr.

What is claimed is:

1. A process for cooling a consumer consisting of at least one partly stabilized superconductive magnet within a hollow conduit, said process including the steps of
   - forming a cooling circuit of helium;
   - initially compressing a stream of helium (1) in said circuit;
   - cooling the compressed helium below the inversion temperature thereof (5, 6);
   - dividing the cooled helium into two part-flows (8, 10);
   - throttling a first part-flow of said part-flows (8);
   - heating said first part-flow by heat exchange with the stream of helium of the unthrottled circuits (7, 6), thereafter expanding said first part-flow while accomplishing work (9), and then combining said part-flow with circuit helium of corresponding pressure downstream (35, 36) of the consumer;
   - simultaneously throttling the second of said part-flow to a pressure above critical pressure (10), cooling said second part-flow by heat exchange with cold circuit helium (11), directing said second part-flow without condensation and evaporation through the hollow conduit (13, 14) while throttling said second part-flow therein, said second part-flow being further throttled to form a mixture of vapor and liquid (15, 16), subsequently heating said second part-flow by heat exchange within the consumer to further evaporate said second part-flow (17, 18), thereafter heating said second part-flow by heat exchange in the cooling circuit (12, 11, 7, 6, 5, 3) to compress said second part-flow, and combining said second part-flow with circuit helium (24).

2. A process as set forth in claim 1 wherein said second part-flow is throttled to above-critical pressure before entry into the hollow conduit and exits the conduit in a gaseous state.

3. A process as set forth in claim 1 wherein said second part-flow leaves the conduit as an under-cooled fluid.

4. A process as set forth in claim 1 which further comprises the steps of positioning adsorption devices (32) in the cooling circuit and passing the helium stream in a gaseous state through the adsorption devices during filling of the cooling circuit to remove impurities contained in the stream.

5. A process of cooling a consumer consisting of a partly stabilized superconductive magnet comprising the steps of
   - forming a cooling circuit for cooling the magnet (13, 14) in which a stream of helium is initially compressed (1), cooled below its inversion temperature (3, 4, 5, 6) subsequently throttled (10) to a pressure above critical pressure and cooled (11, 12), passed through the magnet (13, 14) while being further throttled in at least one valve (15, 16) to form a mixture of gas and liquid, heated downstream of the magnet (12, 11, 7, 6, 5, 3) and compressed (1) before recycling; and by passing a part-flow of helium (8, 9, 35, 36) from said cooling circuit around the magnet, said part-flow being drawn from said cooling circuit after cooling of the helium (3, 5, 6, 7) to its inversion temperature and before throttling to said pressure above critical pressure, throttled (8), heated (7, 6), thereafter expanded (9) while accomplishing work and returned (35, 36) to said cooling circuit downstream of the magnet.

References Cited

UNITED STATES PATENTS

| | | | |
|---|---|---|---|
| 3,199,304 | 8/1965 | Zeitz et al. | 62—79 |
| 3,456,453 | 7/1969 | Carbonell | 62—79 |

MEYER PERLIN, Primary Examiner

R. C. CAPOSSELA, Assistant Examiner

U.S. Cl. X.R.

62—514; 174—15; 335—216